United States Patent
Hong et al.

(10) Patent No.: US 11,570,672 B2
(45) Date of Patent: Jan. 31, 2023

(54) HANDOVER METHOD BETWEEN BASE STATIONS, DEVICE, SYSTEM AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Wei Hong, Beijing (CN); Yajun Zhu, Beijing (CN); Yong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 172 days.

(21) Appl. No.: 16/968,537

(22) PCT Filed: Feb. 9, 2018

(86) PCT No.: PCT/CN2018/076064
§ 371 (c)(1),
(2) Date: Aug. 7, 2020

(87) PCT Pub. No.: WO2019/153279
PCT Pub. Date: Aug. 15, 2019

(65) Prior Publication Data
US 2021/0045027 A1 Feb. 11, 2021

(51) Int. Cl.
*H04W 36/08* (2009.01)
*H04W 36/00* (2009.01)
*H04W 36/30* (2009.01)

(52) U.S. Cl.
CPC ....... *H04W 36/08* (2013.01); *H04W 36/0079* (2018.08); *H04W 36/305* (2018.08)

(58) Field of Classification Search
CPC ............. H04W 36/08; H04W 36/0079; H04W 36/305; H04W 36/0061; H04W 92/20
See application file for complete search history.

(56) References Cited

U.S. PATENT DOCUMENTS

| | | | |
|---|---|---|---|
| 2017/0208518 A1 | 7/2017 | Shu et al. | |
| 2019/0037385 A1* | 1/2019 | Li | H04W 8/08 |
| 2019/0159088 A1* | 5/2019 | Shi | H04W 36/0005 |

FOREIGN PATENT DOCUMENTS

| | | |
|---|---|---|
| CN | 102202365 A | 9/2011 |
| CN | 105993194 A | 10/2016 |

(Continued)

OTHER PUBLICATIONS

Office Action of the Indian application No. 202047038407, dated Nov. 26, 2021.

(Continued)

*Primary Examiner* — Chi H Pham
*Assistant Examiner* — Ji-Hae Yea
(74) *Attorney, Agent, or Firm* — Arch & Lake LLP

(57) ABSTRACT

Disclosed are a handover method for between base stations, and a device, system and storage medium. The base station sends a handover request to a target base station, where the handover request carries type information of a core network used for indicating the type of core network which the UE to be handed over between base stations needs to access. The base station receives a handover response sent from the target base station, where the handover response indicates whether the target base station allows the UE to be handed over to the target base station, and the handover response is sent by the target base station according to the type information of a core network and the type of at least one core network connected to the target base station.

20 Claims, 4 Drawing Sheets

(56) References Cited

FOREIGN PATENT DOCUMENTS

| CN | 106686667 A | 5/2017 |
|---|---|---|
| CN | 108401514 A | 8/2018 |
| WO | 2015143888 A1 | 10/2015 |
| WO | 2016049888 A1 | 4/2016 |

OTHER PUBLICATIONS

International Search Report and Written Opinion in the International Application No. PCT/CN2018/076064 dated Nov. 13, 2018 with English translation, (7p).
Huawei et al. "Further Discussion on Information for Handover" 3GPP TSG-RAN WG2 #99bis R2-1710262, Sep. 29, 2017, sections 1 and 2.2. (4p).
"5G Architecture Options—Full Set", RAN/SA meeting, Jun. 2016, RP-161266, Jun. 15, 2016 (11p).
Huawei et al., "New Work item on LTE connectivity to 5G-CN", 3GPP TSG RAN Meeting #75 RP-170840 Dubrovnik, Croatia, Mar. 6-9, 2017, (7p).
ETSI MCC, "Report of 3GPP TSG RAN2#99bis meeting, Prague, Czech Republic", 3GPP TSG-RAN WG2 meeting #100 R2-1712101, Reno, Nevada, USA, Nov. 27-Dec. 1, 2017, (237p).
Sony, "Handover involving 5GC and EPC", 3GPP TSG RAN WG2 Meeting #100, R2-1712989 Reno, USA, Nov. 27- Dec. 1, 2017.
Ericsson, "Contents of Handover Request", 3GPP TSG-RAN WG2 Ad Hoc on NR Tdoc R2-1707277 Qingdao China, Jun. 27-29, 2017.
Oppo, "Discussion on EPC and 5GC Selection during Intra-LTE Handover with CN Type Change", 3GPP TSG-RAN WG2#100 R2-1712222 Reno, USA, Nov. 27-Dec. 1, 2017.
Supplementary European Search Report in the European application No. 18905838.1, dated Aug. 31, 2021.
"Discussion on Core Network Type Selection based on the Subscription Information", TSG SA WG2 #100, S2-134310 San Francisco, USA, Nov. 11-15, 2013.
Huawei, "Procedure of inter-RAT handover with CN change", 3GPP TSG-RAN WG3 Meeting #94, R3-162953 Reno, Nevada, USA, Nov. 14-18, 2016.
Oppo, "Discussion on Intra-Cell Handover with CN Type Change", 3GPP TSG-RAN WG2#100 R2-1713742 Reno, USA, Nov. 27-Dec. 1, 2017.
First Office Action of the Chinese Application No. 201880000079.4, dated Mar. 3, 2021 with English translation, (13p).
International Search Report to PCT Application No. PCT/CN2018/076064 dated Nov. 13, 2018 with English translation, (4p).
Huawei et al., "Further Discussion on Information for Handover", 3GPP TSG-RAN WG2 #99bis R2-1710262, Prague, Czech Republic, Sep.-Oct. 2017, sections 1 and 2.2, (4p).

\* cited by examiner

HANDOVER METHOD BETWEEN BASE STATIONS, DEVICE, SYSTEM AND STORAGE MEDIUM

CROSS-REFERENCES TO RELATED APPLICATION

This application is the U.S. national phase of PCT Patent Application No. PCT/CN2018/076064 filed on Feb. 9, 2018, the entire content of both of which is incorporated herein by reference for all purposes.

TECHNICAL FIELD

The disclosure relates to the field of wireless communications, and particularly relates to a method, device and system for inter-base station handover, and a storage medium.

BACKGROUND

In a wireless communication system, when User Equipment (UE) moves from a coverage area served by a base station which the UE currently accesses (generally called a source base station) to a coverage area served by another base station (generally called a target base station), in order to ensure the continuity of the communication service, it is necessary to perform inter-base station handover for the UE. The inter-base station handover refers to cutting off the connection between the UE and the source base station and establishing the connection between the UE and the target base station. In practical applications, different base stations may be connected to core networks of different types, and the core networks of the different types may provide different communication services. When a core network to which the target base station is connected cannot provide the communication service required by the UE, after inter-base station handover, the UE cannot work normally, which results in a lower efficiency of inter-base station handover.

SUMMARY

The embodiments of the disclosure provide a method, device and system for inter-base station handover, and a storage medium, which can improve the efficiency of inter-base station handover.

According to a first aspect of the disclosure, a method for inter-base station handover is provided. The method for inter-base station handover may include that: sending a handover request to a target base station, wherein the handover request comprises core network type information, and the core network type information comprises a type of a core network to be accessed by a user equipment (UE) that is to perform inter-base station handover; receiving a handover response from the target base station, where the handover response indicates whether the target base station allows the UE to hand over to the target base station, and the handover response is sent by the target base station according to the core network type information and a type of at least one core network to which the target base station is connected.

According to a second aspect of the disclosure, a method for inter-base station handover is provided. The method for inter-base station handover may include that: receiving a handover request from a source base station, wherein the handover request comprises core network type information, and the core network type information comprises a type of a core network to be accessed by a user equipment (UE) that is to perform inter-base station handover; generating a handover response according to the core network type information and a type of at least one core network to which a target base station is connected, wherein the handover response determines whether the target base station allows the UE to hand over to the target base station; and sending the handover response to the source base station.

According to a third aspect of the disclosure, a source base station is provided. The source base station may include: a processor; and a memory storing instructions executable by the processor. The processor is configured to: send a handover request to a target base station, where the handover request carries core network type information, and the core network type information is used to indicate the type of a core network to be accessed by the UE that is to perform inter-base station handover; and receive handover response from the target base station, where the handover response indicates whether the target base station allows the UE to hand over to the target base station, and the handover response is sent by the target base station according to the core network type information and the type of at least one core network to which the target base station is connected.

According to a fourth aspect of the disclosure, a target base station is provided. The target base station may include: a processor; and a memory storing instructions executable by the processor. The processor is configured to: receive a handover request from a source base station, where the handover request carries core network type information, and the core network type information is used to indicate the type of a core network to be accessed by the UE that is to perform inter-base station handover; generate handover response according to the core network type information and the type of at least one core network to which the target base station is connected, where the handover response indicates whether the target base station allows the UE to hand over to the target base station; and send the handover response to the source base station.

It should be understood that the above general description and the following detailed description are exemplary and explanatory only, and are not intended to limit the disclosure.

BRIEF DESCRIPTION OF THE DRAWINGS

The drawings herein, which are incorporated in and constitute a part of the specification, illustrate embodiments consistent with the disclosure, and explain the principles of the disclosure together with the specification.

DETAILED DESCRIPTION

Figure 1:
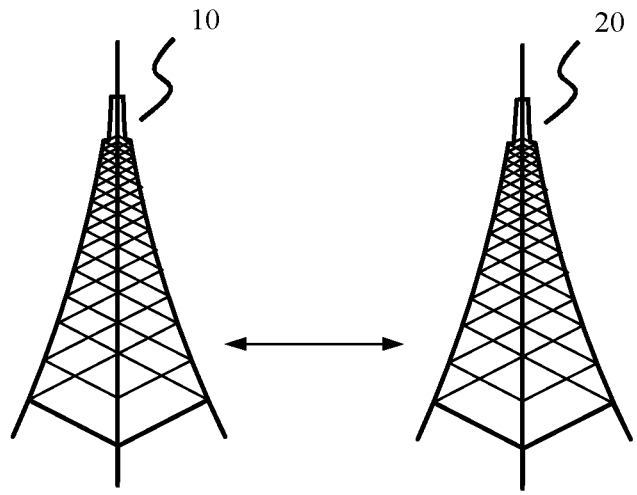
FIG. 1 is a schematic diagram of an implementation environment according to an example of the present disclosure.

In order to make the objectives, technical solutions and advantages of the disclosure clearer, the examples of the disclosure will be further described in detail below with reference to the drawings.

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of devices and methods consistent with some aspects of the disclosure as detailed in the appended claims.

In a wireless communication system, since the coverage area severed by a base station is usually limited, in order to support the mobility of the UE and the continuity of communication service, when the UE moves from a coverage area served by a base station which the UE currently accesses (also called a source base station) to a coverage area served by another base station (also called a target base station), it is usually necessary to perform inter-base station handover for the UE. In practical applications, the inter-base station handover may also be referred to cell handover, handover, or the like.

In practical implementation, during inter-base station handover, the UE may perform cell measurement based on the measurement configuration information sent by the source base station. When the measurement result meets the reporting condition (for example, the reporting condition may be that the signal of a neighbor cell is better than the signal of the cell where the UE is currently located), the UE may send a measurement report to the source base station. The measurement report may include the Physical Cell Identifier (PCI) of at least one neighbor cell and the signal strength of the at least one neighbor cell. After receiving the measurement report, the source base station may determine that the UE is far from the coverage area served by the source base station. In this situation, the source base station may determine a target neighbor cell based on the signal strength of at least one neighbor cell in the measurement report. Generally, the target neighbor cell may be a neighbor cell with the strongest signal strength among the at least one neighbor cell. The source base station may determine the base station to which the target neighbor cell belongs according to the PCI of the target neighbor cell, the base station is the target base station, and then, the source base station may send a handover request to the target base station, to perform inter-base station handover for the UE.

Generally, different base stations may be connected to core networks of different types, and the core networks of the different types may provide different communication services. When the type of the core network to which the target base station is connected is different from the type of the core network to be accessed by the UE, the core network to which the target base station is connected may not provide the communication service required by the UE. In this situation, after inter-base station handover, the UE may not work normally, which results in a lower efficiency of inter-base station handover.

An example of the disclosure provides a method for inter-base station handover. In the method for inter-base station handover, when the core network to be accessed by the UE does not exist in the core networks to which the target base station is connected, the target base station may reject the UE to hand over to the target base station, and when the core network to be accessed by the UE exists in the core networks to which the target base station is connected, the target base station may allow the UE to hand over to the target base station, thereby avoiding the situation that the UE may not work normally after inter-base station handover, and improving the efficiency of inter-base station handover.

The following examples of the disclosure will describe the implementation environment involved in the method for inter-base station handover. As illustrated in FIG. 1, the implementation environment may include a source base station 10 and a target base station 20. The source base station 10 is the base station currently accessed by the UE that is to perform inter-base station handover, and the target base station 20 is the base station to which the UE is to hand over. The target base station 20 may be connected to at least one core network. For example, the target base station 20 may be connected to a Next Generation Core Network (NGCN) in a 5G (The Fifth Generation Mobile Communication Technology) communication system and/or connected to an Evolved Packet Core (EPC) in a Long Term Evolution (LTE) communication system.

Figure 2:
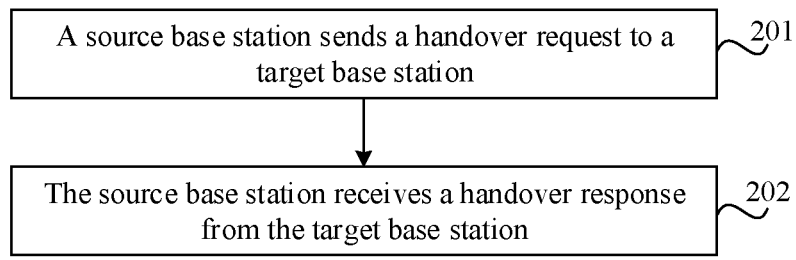
FIG. 2 is a flowchart of a method for inter-base station handover according to an example of the present disclosure.

FIG. 2 is a flowchart of a method for inter-base station handover according to an example. As illustrated in FIG. 2, the method for inter-base station handover is applied to the source base station 10 illustrated in FIG. 1. The method for inter-base station handover includes the following operations.

In 201, a source base station sends a handover request to the target base station.

The handover request carries core network type information, and the core network type information is used to indicate a type of a core network to be accessed by the UE that is to perform inter-base station handover.

In 202, the source base station receivers a handover response from the target base station.

The handover response is used to indicate whether the target base station allows the UE to hand over to the target base station, and the handover response is sent by the target base station according to the core network type information and a type of at least one core network to which the target base station is connected.

According to the method for inter-base station handover provided by examples of the disclosure, the handover request is sent to the target base station, where the handover request carries the core network type information which is used to indicate the type of a core network to be accessed by the UE for which the inter-base station handover is to be performed, so that the target base station may return the handover response according to the core network type information and the type of at least one core network to which the target base station is connected, and the handover response may indicate whether the target base station allows the UE to hand over to the target base station. In this way, when the core network to which the target base station is connected may not provide the communication service required by the UE, the target base station may reject the UE to hand over to the target base station, thereby avoiding the situation that the UE may not work normally after inter-base station handover, and improving the efficiency of inter-base station handover.

Figure 3:
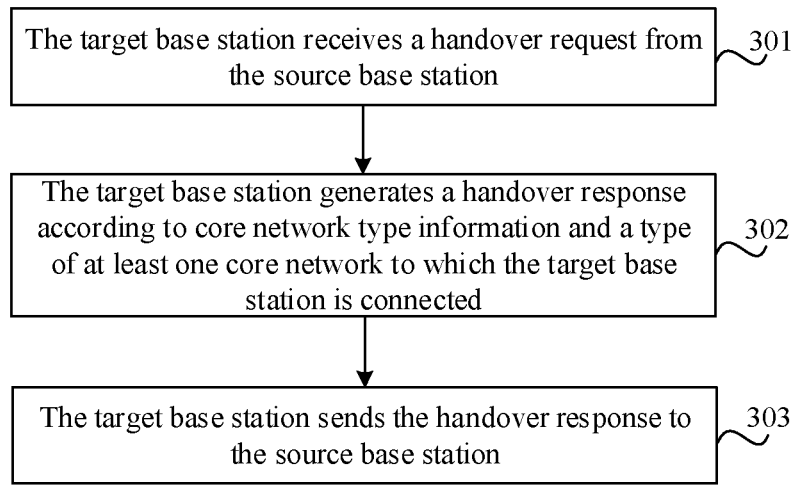
FIG. 3 is a flowchart of a method for inter-base station handover according to an example of the present disclosure.

FIG. 3 is a flowchart of a method for inter-base station handover according to an example of the present disclosure. As illustrated in FIG. 3, the method for inter-base station handover is applied to the target base station 20 illustrated in FIG. 1. The method for inter-base station handover includes the following operations.

In 301, a target base station receives a handover request from a source base station.

The handover request carries core network type information, and the core network type information is used to indicate a type of a core network to be accessed by the UE that is to perform inter-base station handover.

In 302, the target base station generates a handover response according to the core network type information and a type of at least one core network to which the target base station is connected.

The handover response is used to indicate whether the target base station allows the UE to hand over to the target base station.

In 303, the target base station sends the handover response to the source base station.

According to the method for inter-base station handover provided by the examples of the disclosure, the handover request sent by the source base station is received, where the handover request carries the core network type information which is used to indicate the type of a core network to be accessed by the UE that is to perform inter-base station handover, the handover response is returned according to the core network type information and the type of at least one core network to which the target base station is connected, and the handover response may indicate whether the target base station allows the UE to hand over to the target base station. In this way, when the core network to which the target base station is connected may not provide the communication service required by the UE, the target base station may reject the UE to hand over to the target base station, thereby avoiding the situation that the UE may not work normally after inter-base station handover, and improving the efficiency of inter-base station handover.

Figure 4:
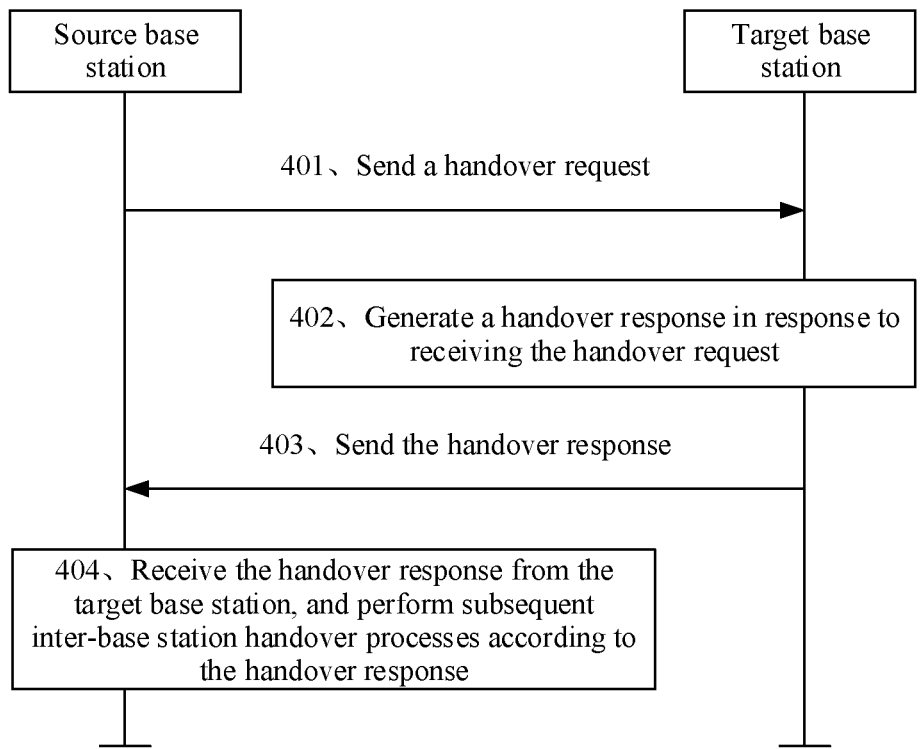
FIG. 4 is a flowchart of a method for inter-base station handover according to an example of the present disclosure.

FIG. 4 is a flowchart of a method for inter-base station handover according to an example. As illustrated in FIG. 4, the method for inter-base station handover is applied to the implementation environment illustrated in FIG. 1. The method for inter-base station handover includes the following operations.

In 401, a source base station sends a handover request to a target base station.

As mentioned above, the source base station may receive a measurement report from the UE and determine the target base station according to the PCI of a neighbor cell carried in the measurement report. After the target base station is determined, the source base station may send a handover request to the target base station to perform inter-base station handover for the UE.

In an example of the disclosure, the handover request sent by the source base station to the target base station may carry core network type information, and the core network type information may indicate the type of a core network to be accessed by the UE. For example, the core network type information may indicate that a core network to be accessed by the UE is of an NGCN type, or the core network type information may indicate that a core network to be accessed by the UE is of an EPC type.

In an example of the disclosure, the UE may determine the type of a core network to be accessed by the UE according to the type of the communication service in the UE. For example, when the UE performs a low-latency and high-reliability communication service, since the low-latency and high-reliability communication service is a communication service supported by the NGCN, in this situation, the UE may determine that the core network to be accessed by the UE is of the NGCN type. The UE may report the type of the core network to be accessed by the UE to the source base station during random access, thus, during inter-base station handover, the source base station may generate core network type information according to the type of the core network reported by the UE and send the core network type information to the target base station.

In a possible implementation, the core network type information may be carried in the Radio Resource Control Context (RRC Context) of the handover request. Further, the core network type information may be carried in Handover Preparation Information of the RRC Context.

It should be noted that the source base station may directly send the handover request to the target base station through an interface (such as X2 interface) between the source base station and the target base station, or may send the handover request to the target base station through a Mobility Management Entity (MME), which is not specifically limited in the examples of the disclosure.

In 402, the target base station generates a handover response in response to receiving the handover request.

After receiving the handover request from the source base station, the target base station may extract the core network type information from the handover request and obtain the type of the core network indicated by the core network type information. Then, the target base station may determine whether the target core network exists in the core networks to which the target base station is connected, where the type of the target core network is the same as the type of the core network indicated by the core network type information. The target base station may generate the handover response according to the determination result, and the handover response is used to indicate whether the target base station allows the UE to hand over to the target base station.

In a possible situation, the target core network does not exist in the core networks to which the target base station is connected. For example, if the core network indicated by the core network type information is of the NGCN type and the core network to which the target base station is connected is an EPC core network, it is determined that the target core network does not exist in the core network to which the target base station is connected. In this situation, the handover response generated by the target base station may be handover rejecting information, and the handover rejecting information indicates that the target base station does not allow the UE to hand over to the target base station. In practical applications, the handover rejecting information may be Handover Preparation Failure information.

In an example of the disclosure, the handover rejecting information may carry failure reason indication information, and the failure reason indication information indicates that the reason why the target base station does not allow the UE to hand over to the target base station is that the target core network is absent in the core networks to which the target base station is connected. In practical implementation, the failure reason indication information may be located in a preset position of the handover rejecting information, and the failure reason indication information may be a specific indication field. For example, the indication field may be "0", "1", or the like.

In another possible situation, the target core network exists in the core networks to which the target base station is connected. For example, if the core network indicated by the core network type information is of the NGCN type and the core networks to which the target base station is connected are NGCN core networks, it is determined that the target core network exists in the core networks to which the target base station is connected. In this situation, the handover response generated by the target base station may be handover allowing information, and the handover allowing information indicates that the target base station allows the UE to hand over to the target base station. In practical implementation, the handover allowing information may be Handover Request Acknowledge.

In 403, the target base station sends the handover response to the source base station.

After generating the handover response, the target base station may send the handover response to the source base station, to cause the source base station to perform subsequent inter-base station handover processes according to the handover response.

In 404, the source base station receives the handover response from the target base station, and performs subsequent inter-base station handover processes according to the handover response.

When the handover response is the handover allowing information, the source base station may perform subsequent inter-base station handover processes, so that the UE is handed over to the target base station. The subsequent inter-base station handover processes may refer to that in the related art and are not described in the examples of the disclosure.

When the handover response is the handover rejecting information, the source base station may select, based on the measurement report of the UE, another base station as the base station to which the UE is to hand over, and perform inter-base station handover based on the base station. When a core network with the same type as the core network to be accessed by the UE exists in at least one core network to which the base station is connected, the UE may hand over to the base station. When no core network with a same type as the core network to be accessed by the UE exists in at least one core network to which the another base station is connected, the source base station may select a base station as the base station to which the UE is to hand over again until the UE completes the inter-base station handover.

According to the method for inter-base station handover provided by the examples of the disclosure, the handover request is sent to the target base station, where the handover request carries the core network type information which is used to indicate a type of a core network to be accessed by the UE for which inter-base station handover is to be performed, so that the target base station may return the handover response according to the core network type information and the type of at least one core network to which the target base station is connected, and the handover response may indicate whether the target base station allows the UE to hand over to the target base station. In this way, when the core network to which the target base station is connected may not provide the communication service required by the UE, the target base station may reject the UE to hand over to the target base station, thereby avoiding the situation that the UE may not work normally after inter-base station handover, and improving the efficiency of inter-base station handover.

Figure 5:
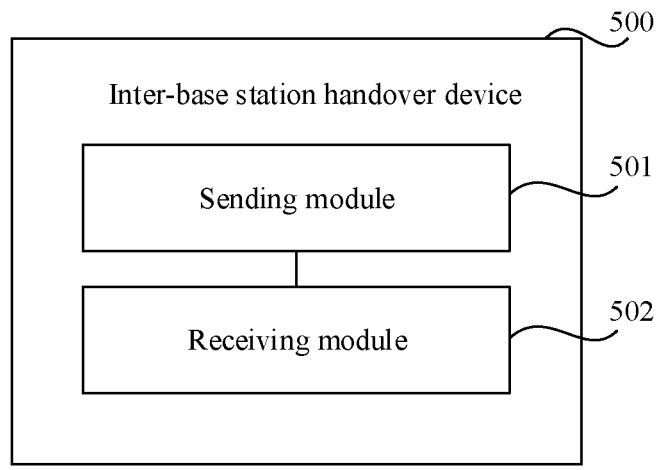
FIG. 5 is a block diagram of a device for inter-base station handover according to an example of the present disclosure.

FIG. 5 is a block diagram of a device for inter-base station handover 500 according to an example. The device for inter-base station handover 500 may be the source base station 10 illustrated in FIG. 1. Referring to FIG. 5, the device for inter-base station handover 500 includes a sending module 501 and a receiving module 502.

The sending module 501 is configured to send a handover request to a target base station, where the handover request carries core network type information, and the core network type information is used to indicate the type of a core network to be accessed by the UE that is to perform inter-base station handover.

The receiving module 502 is configured to receive the handover response from the target base station, where the handover response indicates whether the target base station allows the UE to hand over to the target base station, and the handover response is sent by the target base station according to the core network type information and the type of at least one core network to which the target base station is connected.

In an example of the disclosure, the handover response includes handover allowing information, and the handover allowing information indicates that the target base station allows the UE to hand over to the target base station. The handover allowing information is sent by the target base station in response to determining that a target core network is present in the core networks to which the target base station is connected, and the type of the target core network is the same as the type of the core network indicated by the core network type information.

In an example of the disclosure, the handover allowing information is handover request acknowledge information.

In an example of the disclosure, the handover response includes handover rejecting information, and the handover rejecting information indicates that the target base station rejects the UE to hand over to the target base station. The handover rejecting information is sent by the target base station in response to determining that a target core network is absent in the core networks to which the target base station is connected, and the type of the target core network is the same as the type of the core network indicated by the core network type information.

In an example of the disclosure, the handover rejecting information carries failure reason indication information, and the failure reason indication information indicates that the reason why the target base station rejects the UE to hand over to the target base station is that the target core network is absent in the core networks to which the target base station is connected.

In an example of the disclosure, the handover rejecting information is handover preparation failure information.

In conclusion, according to the device for inter-base station handover provided by the examples of the disclosure, the handover request is sent to the target base station, where the handover request carries the core network type information which is used to indicate the type of a core network to be accessed by the UE that is to perform inter-base station handover, so that the target base station may return the handover response according to the core network type information and the type of at least one core network to which the target base station is connected, and the handover response may indicate whether the target base station allows the UE to hand over to the target base station. In this way, when the core network to which the target base station is connected may not provide the communication service required by the UE, the target base station may reject the UE to hand over to the target base station, thereby avoiding the situation that the UE may not work normally after inter-base station handover, and improving the efficiency of inter-base station handover.

With respect to the device in the above example, the specific manners for performing operations for individual modules therein have been described in detail in the example regarding the method, which will not be elaborated herein.

Figure 6:
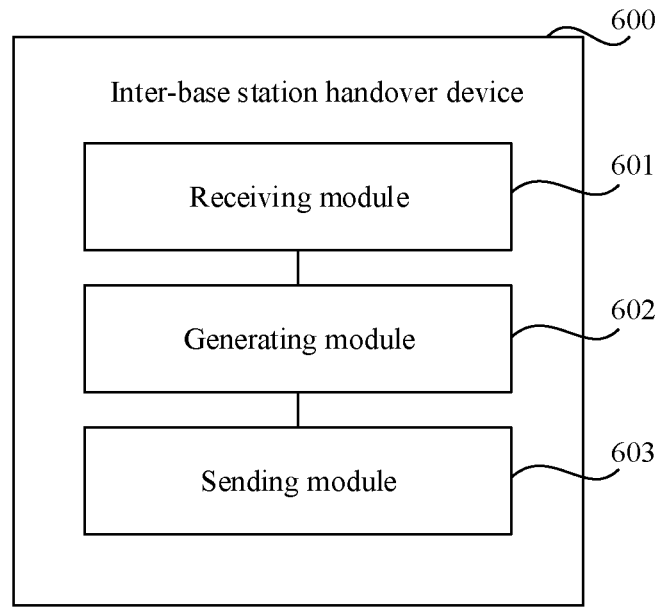
FIG. 6 is a block diagram of a device for inter-base station handover according to an example of the present disclosure.

FIG. 6 is a block diagram of a device for inter-base station handover 600 according to an example. The device for inter-base station handover 600 may be the target base station 20 illustrated in FIG. 1. Referring to FIG. 6, the device for inter-base station handover 600 includes a receiving module 601, a generating module 602 and a sending module 603.

The receiving module 601 is configured to receive a handover request from a source base station, where the handover request carries core network type information, and the core network type information is used to indicate the type of a core network to be accessed by the UE that is to perform inter-base station handover.

The generating module 602 is configured to generate a handover response according to the core network type information and the type of at least one core network to which the target base station is connected, where the handover response indicates whether the target base station allows the UE to hand over to the target base station.

The sending module 603 is configured to send the handover response to the source base station.

In an example of the disclosure, the handover response includes handover allowing information. The generating module 602 is configured to: generate the handover allowing information in response to determining that a target core network is present in the core networks to which the target base station is connected. The handover allowing information indicates that the target base station allows the UE to hand over to the target base station, and the type of the target core network is the same as the type of the core network indicated by the core network type information.

In an example of the disclosure, the handover allowing information is handover request acknowledge information.

In an example of the disclosure, the handover response includes handover rejecting information, and the generating module 602 is configured to: generate the handover rejecting information in response to determining that a target core network is absent in the core networks to which the target base station is connected. The handover rejecting information indicates that the target base station rejects the UE to hand over to the target base station, and the type of the target core network is the same as the type of the core network indicated by the core network type information.

In an example of the disclosure, the handover rejecting information carries failure reason indication information, and the failure reason indication information indicates that the reason why the target base station rejects the UE to hand over to the target base station is that the target core network is absent in the core networks connected to the target base station.

In an example of the disclosure, the handover rejecting information is handover preparation failure information.

In conclusion, according to the device for inter-base station handover provided by the examples of the disclosure, the handover request sent by the source base station is received, where the handover request carries the core network type information which is used to indicate the type of a core network to be accessed by the UE that is to perform inter-base station handover, the handover response is returned according to the core network type information and the type of at least one core network to which the target base station is connected, and the handover response may indicate whether the target base station allows the UE to hand over to the target base station. In this way, when the core network to which the target base station is connected may not provide the communication service required by the UE, the target base station may reject the UE to hand over to the target base station, thereby avoiding the situation that the UE may not work normally after inter-base station handover, and improving the efficiency of inter-base station handover.

With respect to the device in the above example, the specific manners for performing operations for individual modules therein have been described in detail in the example regarding the method, which will not be elaborated herein.

Figure 7:
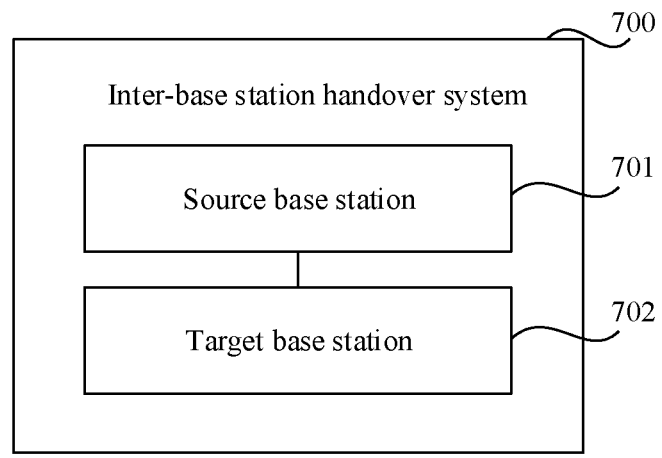
FIG. 7 is a block diagram of a system for inter-base station handover according to an example of the present disclosure.

FIG. 7 is a block diagram of a system for inter-base station handover 700 according to an example. As illustrated in FIG. 7, the system for base station handover 700 includes a source base station 701 and a target base station 702.

The source base station 701 is configured to perform the method for inter-base station handover performed by the source base station in the example illustrated in FIG. 4.

The target base station 702 is configured to perform the method for inter-base station handover performed by the target base station in the example illustrated in FIG. 4.

Figure 8:
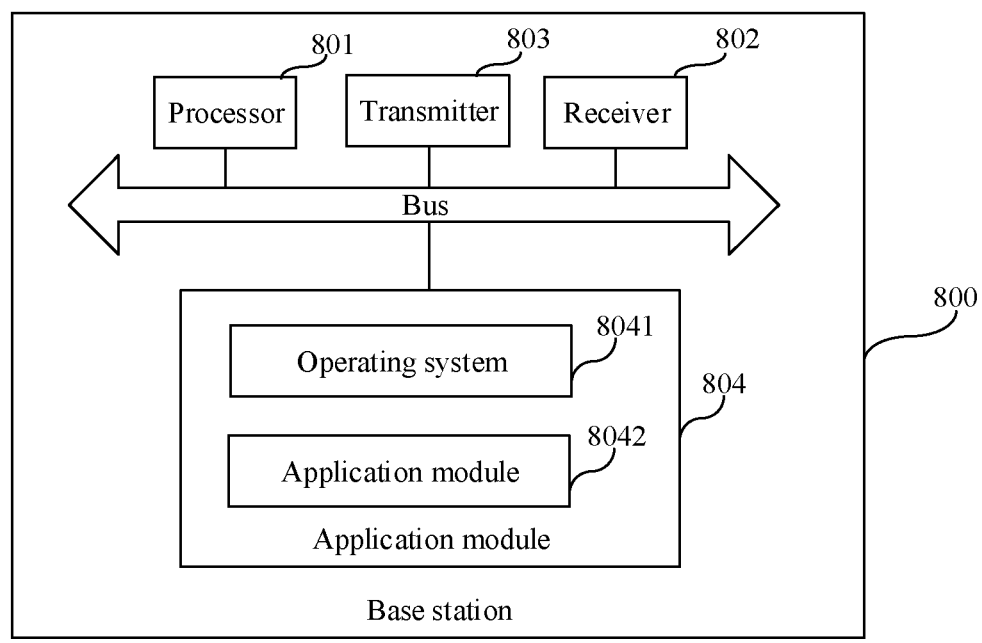
FIG. 8 is a block diagram of a base station according to an example of the present disclosure.

FIG. 8 is a block diagram of a base station 800 according to an example. The base station 800 may be a target base station or a source base station. As illustrated in FIG. 8, the base station 800 may include a processor 801, a receiver 802, a transmitter 803 and a memory 804. The receiver 802, the transmitter 803 and the memory 804 are connected to the processor 801 through a bus.

The processor 801 includes one or more processing cores, and the processor 801 performs the method performed by the target base station or the source base station in the method for inter-base station handover provided by the examples of the disclosure by running software programs and modules. The memory 804 may be configured to store the software programs and the modules. Specifically, the memory 804 may store an operating system 8041 and at least one application program module 8042 required by the function. The receiver 802 is configured to receive communication data from another device. The transmitter 803 is configured to send communication data to another device.

In an example, a computer-readable storage medium is further provided. A Computer program is stored in the computer-readable storage medium, and when the stored computer program is executed by one or more processing components, a method for inter-base station handover may be implemented. For example, the method for inter-base station handover may include that: a handover request is sent to a target base station, where the handover request carries core network type information, and the core network type information is used to indicate the type of a core network to be accessed by the UE that is to perform the inter-base station handover; and the handover response sent by the target base station is received, where the handover response indicates whether the target base station allows the UE to hand over to the target base station, and the handover response is sent by the target base station according to the core network type information and the type of at least one core network to which the target base station is connected.

Or, the method for inter-base station handover may include that: a handover request sent by a source base station is received, where the handover request carries core network type information, and the core network type information is used to indicate the type of a core network to be accessed by the UE that is to perform inter-base station handover; a handover response is generated according to the core network type information and the type of at least one core network to which the target base station is connected, where the handover response indicates whether the target base station allows the UE to hand over to the target base station; and the handover response is sent to the source base station.

It should be noted that "and/or" in the examples of the disclosure may represent three logical relationships. For example, A and/or B may represent: there are three cases of A alone, B alone, and both A and B.

Those skilled in the art will easily think of other implementation solutions of the disclosure after considering the specification and practicing the invention disclosed here. The present application is intended to cover any variation, use or adaptation of the disclosure, which follows the general principles of the disclosure and includes common knowledge or conventional technical means in the technical field not disclosed in the disclosure. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for inter-base station handover, performed by a source base station, comprising:
    sending a handover request to a target base station, wherein the handover request comprises core network type information, and the core network type information comprises a type of a core network to be accessed by a user equipment (UE) that is to perform inter-base station handover;
    receiving a handover response from the target base station, wherein the handover response indicates whether the target base station allows the UE to hand over to the target base station, and the handover response is sent by the target base station according to the core network type information and a type of at least one core network to which the target base station is connected; and
    when the handover response comprises handover rejecting information indicating that the target base station rejects the UE to hand over to the target base station, selecting another base station as a base station to which the UE is to hand over, and performing inter-base station handover based on the another base station; wherein a core network with the same type as the core network to be accessed by the UE exists in at least one core network to which the another base station is connected.

2. The method of claim 1, wherein the handover response comprises handover allowing information indicating that the target base station allows the UE to hand over to the target base station; and
    the handover allowing information is sent by the target base station in response to determining that a target core network is present in core networks to which the target base station is connected, and a type of the target core network is same as the type of the core network in the core network type information.

3. The method of claim 2, wherein the handover allowing information comprises handover request acknowledge information.

4. The method of claim 1, wherein
    the handover rejecting information is sent by the target base station in response to determining that a target core network is absent in core networks to which the target base station is connected, and a type of the target core network is same as the type of the core network in the core network type information.

5. The method of claim 4, wherein the handover rejecting information comprises failure reason indication information, and the failure reason indication information comprises a reason why the target base station rejects the UE to hand over to the target base station is that the target core network is absent in the core networks to which the target base station is connected.

6. The method of claim 4, wherein the handover rejecting information comprises handover preparation failure information.

7. A method for inter-base station handover, performed by a target base station, comprising:
    receiving a handover request from a source base station, wherein the handover request comprises core network type information, and the core network type information comprises a type of a core network to be accessed by a user equipment (UE) that is to perform inter-base station handover;
    generating a handover response according to the core network type information and a type of at least one core network to which a target base station is connected, wherein the handover response indicates whether the target base station allows the UE to hand over to the target base station, wherein when the handover response comprises handover rejecting information indicating that the target base station rejects the UE to hand over to the target base station, the handover response indicates the target base station to select another base station as a base station to which the UE is to hand over, and perform inter-base station handover based on the another base station; wherein a core network with the same type as the core network to be accessed by the UE exists in at least one core network to which the another base station is connected; and
    sending the handover response to the source base station.

8. The method of claim 7, wherein the handover response comprises handover allowing information, and
    wherein generating the handover response according to the core network type information and the type of at least one core network to which the target base station is connected comprises:
    generating the handover allowing information in response to determining that a target core network is present in core networks to which the target base station is connected,
    wherein the handover allowing information indicates that the target base station allows the UE to hand over to the target base station, and a type of the target core network is same as the type of the core network in the core network type information.

9. The method of claim 8, wherein the handover allowing information comprises handover request acknowledge information.

10. The method of claim 7, wherein
    generating the handover response according to the core network type information and the type of at least one core network to which the target base station is connected comprises:
    generating the handover rejecting information in response to determining that a target core network is absent in core networks to which the target base station is connected, wherein a type of the target core network is same as the type of the core network in the core network type information.

11. The method of claim 10, wherein the handover rejecting information comprises failure reason indication information, and the failure reason indication information comprises a reason why the target base station rejects the UE to hand over to the target base station is that the target core network is absent in the core networks to which the target base station is connected.

12. The method of claim 10, wherein the handover rejecting information comprises handover preparation failure information.

13. A target base station, comprising:
a processor,
a memory storing instruction executable by the processor, wherein the processor is configured to perform the method for inter-base station handover of claim 7.

14. The target base station of claim 13, wherein the handover response comprises handover allowing information, and the processor is configured to:
generate the handover allowing information in response to determining that a target core network is present in the core networks to which the target base station is connected, wherein the handover allowing information indicates that the target base station allows the UE to hand over to the target base station, and a type of the target core network is the same as a type of a core network indicated by the core network type information.

15. The target base station of claim 13, wherein the processor is configured to:
generate the handover rejecting information in response to determining that a target core network is absent in the core networks to which the target base station is connected; and
a type of the target core network is same as the type of the core network indicated by the core network type information.

16. The target base station of claim 15, wherein the handover rejecting information comprises failure reason indication information, and the failure reason indication information comprises a reason why the target base station rejects the UE to hand over to the target base station is that the target core network is absent in the core networks to which the target base station is connected.

17. A source base station, comprising:
a processor, and
a memory storing instructions executable by the processor, wherein the processor is configured to:
send, through a transmitter, a handover request to a target base station, wherein the handover request comprises core network type information, and the core network type information comprises a type of a core network to be accessed by a user equipment (UE) that is to perform inter-base station handover;
receive, by a receiver, a handover response from the target base station, wherein the handover response indicates whether the target base station allows the UE to hand over to the target base station, and the handover response is sent by the target base station according to the core network type information and a type of at least one core network to which the target base station is connected; and
when the handover response comprises handover rejecting information indicating that the target base station rejects the UE to hand over to the target base station, select another base station as a base station to which the UE is to hand over, and perform inter-base station handover based on the another base station; wherein a core network with the same type as the core network to be accessed by the UE exists in at least one core network to which the another base station is connected.

18. The source base station of claim 17, wherein the handover response comprises handover allowing information, and the handover allowing information indicates that the target base station allows the UE to hand over to the target base station; and
the handover allowing information is sent by the target base station in response to determining that a target core network is present in the core networks to which the target base station is connected, and a type of the target core network is same as the type of the core network in the core network type information.

19. The source base station of claim 17, wherein the handover rejecting information is sent by the target base station in response to determining that a target core network is absent in the core networks to which the target base station is connected, and a type of the target core network is same as the type of the core network in the core network type information.

20. The source base station of claim 19, wherein the handover rejecting information comprises failure reason indication information, and the failure reason indication information comprises a reason why the target base station rejects the UE to hand over to the target base station is that the target core network is absent in the core networks to which the target base station is connected.

* * * * *